INVENTOR
G. E. MC LAUGHLIN
BY
ATTORNEY

FIG. 6

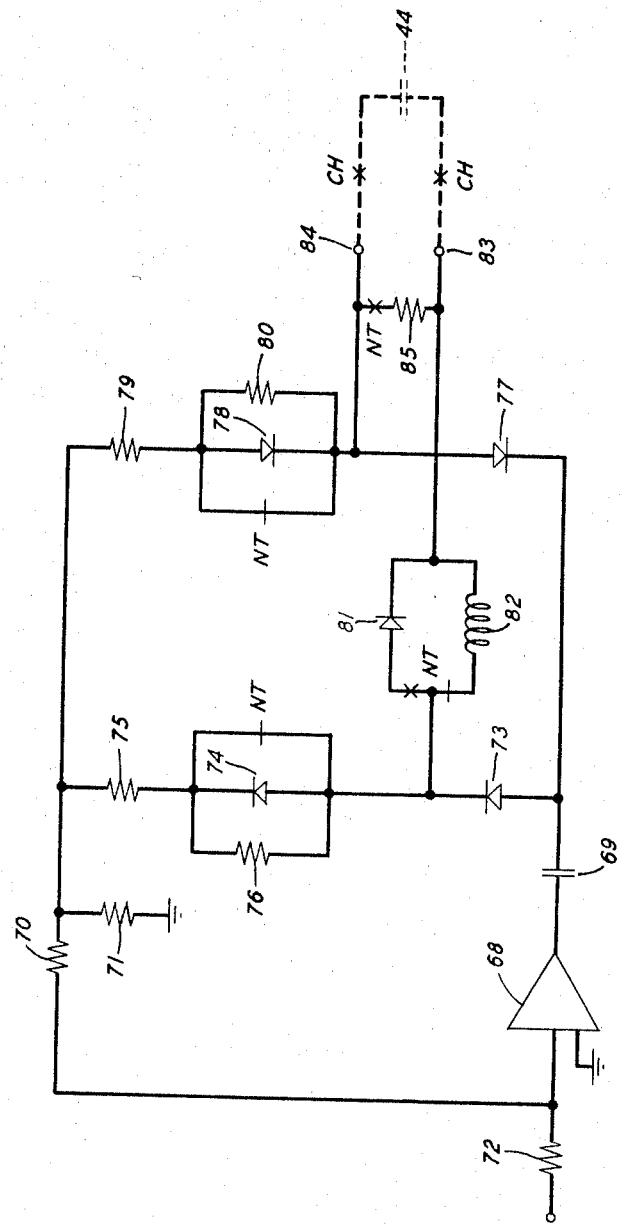

United States Patent Office 3,431,369
Patented Mar. 4, 1969

3,431,369
ELECTRICAL TRANSMISSION TESTING SYSTEM HAVING TEST RESULTS TRANSMITTED IN PULSE WIDTH MODULATION FORM
George E. McLaughlin, Colts Neck, N.J., assignor to Bell Telephone Laboratories, Incorporated, New York, N.Y., a corporation of New York
Filed Mar. 29, 1966, Ser. No. 538,350
U.S. Cl. 179—175.3           12 Claims
Int. Cl. H04b 3/46; H03k 5/20

This invention relates to performing two-way transmission tests on communication paths.

The addition of direct distance dialing to a telephone system requires a second look at interoffice trunk testing. First, there is the loss of inherent surveillance provided by an operator when establishing connections. This loss requires more frequent trunk testing and also testing where testing was not previously performed. If, outage time is not to increase, this added testing requires that testing be performed more quickly. Second, accumulated transmission deterioration may increase because direct distance dialing can serially connect a greater number of trunks than normally connected by an operator. If accumulated deterioration is not to increase, more sensitive testing is required so that the quality of the trunk may be maintained within closer limits.

The fastest and most sensitive communication path test apparatus found in the prior art appear to be disclosed in: U.S. Patent 2,721,235, issued to B. McKim et al. on Oct. 18, 1955; U.S. Patent 2,819,354, issued to H. F. Shoffstall on Jan. 7, 1958; and Ericsson Review, vol. 40, No. 2 (1963), starting on page 62. Each of these arrangements has near-end and far-end equipments that interconnect attenuators on a cut-and-try basis in the process of making measurements. The number of attenuators that must be tried determines the speed of operation and the sensitivity of the measurements. Furthermore, this number is a compromise because changing it improves one of these characteristics while impairing the other. This compromise limits performance to the point that desired test requirements for direct distance dialing telephone systems cannot be met.

An object of the present invention is to test communication paths faster and with a higher degree of sensitivity than heretofore possible.

This and other objects are achieved by using amplitude-to-pulse width converters in near-end and far-end test equipment to produce pulses having durations related to the amplitudes of received waves. The far-end produced pulses are transmitted over the path under test to the near-end terminal. At the near-end terminal, indications are produced which are related to the pulse durations.

Embodiments of the present invention perform their tests more quickly than the above-mentioned prior art arrangements because the converters produce outputs many times faster than the attenuator arrangements. On the other hand, the tests are more sensitive because the converter outputs and inputs are continuously related to one another rather than related in a discontinuous manner as in the attenuator arrangements.

In a typical embodiment of the invention, each converter produces output pulses having durations logarithmically related to the amplitudes of signals applied to the converter. The converter input signals selectively comprise received test tones, received noise, locally produced test tones that simulate received test tones and locally produced test tones that simulate noise. The outputs of far-end converters are transmitted to the near-end equipment by a frequency shift data transmitter. A the near-end a frequency shift data transmitter recovers the far-end pulses. The outputs of the frequency shift data receiver and the near-end converter are applied to computational circuits that, in turn, indicate when pulse durations fall outside of predetermined limits. These outputs are in terms of decibels because the pulse durations are logarithmically related to the amplitudes of the measured signals. Control of all of these operations is provided in response to a program stored at the near-end terminal.

In addition to measuring trunks connected between near-end and far-end equipments, a trunk remote from an existing near-end equipment can be tested without providing a relatively expensive near-end equipment at either end of the trunk. This is accomplished by providing a far-end equipment at each end of the trunk to be tested and, furthermore, providing one of these far-end equipments with an additional input so that control inputs and measurement outputs can be passed between it and the existing near-end equipment. all of the testing and measuring are therefore performed by the far-end equipments in response to control signals from the near-end equipment with the measurements transmitted back to the near-end equipment.

Other objects and features of the invetnion will become apparent from a study of the following detailed description of an illustrative embodiment.

In the drawings:

FIGS. 5 and 6 are timing diagrams for use in explaining the operation of the disclosed embodiment; and FIG. 7 is a schematic diagram of an amplifier-rectifier circuit that may be used when practicing the invention.

Figure 1:
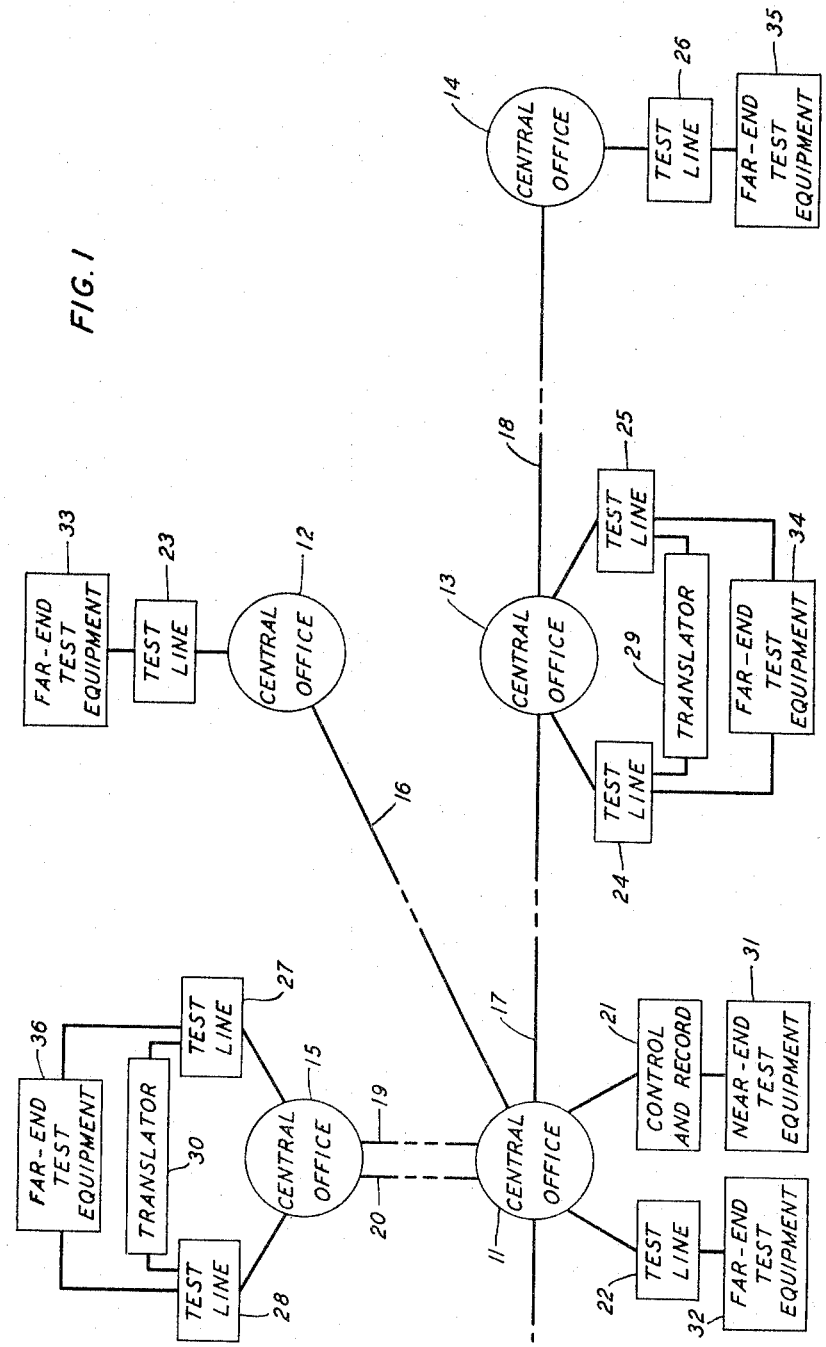
FIG. 1 is a block diagram of a portion of a telephone system using the invention.

*Description of FIG. 1*

FIG. 1 shows a telephone network and associated apparatus for testing trunks within the network. The network includes five central offices 11–15 interconnected by trunks 16–20. The remaining equipment, which includes the invention, forms the test apparatus. This apparatus performs loss and noise measurements of all the trunks and collects, checks and records the measurements at office 11.

The test apparatus includes a control and record equipment 21 connected to central office 11. Equipment 21 contains a stored program that directs specific trunks and far-end equipments to be seized for testing purposes and then starts the testing procedure. It also records the results of the tests.

The test apparatus also includes test lines 22–28. Each test line is seized by dialing a number assigned to it. Once seized it furnishes acknowledging supervisory signals to trunk and office switching equipment. It also furnishes trunk parameter information (such as two- or four-wire) to far-end test equipment connected to it.

Connected between test lines 24 and 25 and test lines 27 and 28 are translators 29 and 30. These translators respond to signals received through test lines 24 and 27 and transmit signals through test lines 25 and 28 that result in the seizure of a particular trunk and test line at the other end of the trunk.

A near-end test equipment 31 is connected to control and record equipment 21 and a plurality of far-end test equipments 32–36 are connected to test lines 22–28. These equipments function to perform loss and noise measurements the trunks once the appropriate equipments and trunks have been interconnected. Detailed descriptions of these equipments are therefore delayed until after the following brief description of the general operation of FIG. 1.

*General operation of FIG. 1*

When the stored program in control and record equipment 21 indicates that trunk 16 is to be tested, the control and record equipment directs office 11 to seize trunk 16 and dials test line 23. Upon connection of test line 23, the test line transmits supervisory signals to control and record equipment 21 to indicate readiness. Testing instructions from the stored program are then applied to near-end test equipment 31 which in turn transmits control signals to initiate action in far-end test equipment 33. As the tests are performed, measurements are accumulated and checked in the near-end test equipment 31 with the results recorded in control and record equipment 21.

Trunks 17 and 19 are each tested in a similar manner.

Although trunk 18 is not directly connected to office 11, the invention permits the trunk to be measured. This is a highly desirable feature of the invention because equipment at the near-end, which is expensive compared to equipment at the far-end, need not be located at one terminal of each of the trunks to be tested.

To test trunk 18, the trunk 17 and test line 24 are first seized through office 11. Trunk 17 functions as an access trunk. Translator 29 then recognizes a signal from office 11 (by way of access trunk 17 and test line 24) and transmits a signal through test line 25 that causes trunk 18 and test line 26 to be seized. Supervisory signals from test line 26 inform control and record equipment 21 that all connections are completed for the tests. Testing instructions from the stored program are then applied to near-end test equipment 31. Initiating signals from near-end test equipment 31 pass through double-ended far-end test equipment 34 to single-ended far-end test equipment 35. In response to these signals, the far-end equipments perform the desired tests and transmit the measurements back to near-end test equipment 31. The measurements are checked in near-end test equipment 31 with the results recorded in control and record equipment 21.

Trunk 20 differs from the other trunks as it is seizable only by office 15. (Such trunks are frequently found in telephone systems.) In testing this trunk, office 11 first seizes an access trunk to office 15 (such as trunk 19). Test line 27 is then dialed. When control and record equipment 21 recognizes that test line 27 is connected to trunk 19, signals are transmitted to translator 30 to cause trunk 20 and test line 22 to be seized. When all connections are completed, supervisory signals are transmitted from test line 22 through trunk 20, through the equipment at office 15 and through trunk 19 to control and record equipment 21. Control and record equipment 21 then directs near-end test equipment 31 to begin testing. Control signals from equipment 31 initiate actions in far-end test equipments 32 and 36 so that these far-end test equipments perform the desired tests and transmit the measurements back to near-end test equipment 31. As before, the measurements are checked by near-end test equipment 31 with the results recorded in control and record equipment 21. (It should be noted that the testing of trunk 20 is substantially identical to the testing of trunk 18; in other words, the last described configuration is reproduced when office 14, test line 26 and far-end test equipment are "folded over" to the left so as to overlay office 11, test line 22 and far-end test equipment 32, respectively.)

Figure 2:
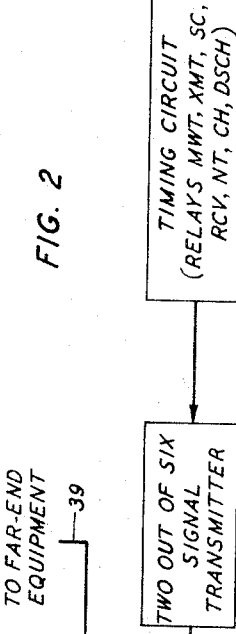
FIG. 2 is a block diagram of a near-end test equipment for use in FIG. 1.

*Description of FIG. 2*

The near-end equipment disclosed in FIG. 2 includes a timing circuit 36 which is triggered by start signals on lead 37 from record and control equipment 21 of FIG. 1. Included in timing circuit 36 are a plurality of relays MWT, XMT, SC, RCV, NT, CH and DSCH. The contacts for these relays are shown in detached form on various leads of FIG. 2. Circuit 36 controls the operation of the relays in a sequence which is later discussed in detail with the use of FIGS. 5 and 6. Circuit 36 also applies signals to a conventional two-out-of-six frequency signal transmitter 38. When transmitter 38 is producing an output, relay XMT is operated so that the transmitter output passes over a lead 39 toward a far-end equipment.

For loss measurements, test signals received over lead 39 pass through an amplifier 40 and a high-pass filter 41. The output of filter 41 is applied to an amplitude-to-pulse width converter 42. The converter includes an amplifier-rectifier 43 that applies its output across a capacitor 44 when the relay CH is operated. This amplifier-rectifier may take the form of the one disclosed in FIG. 7. Because a discussion of its operation is relatively involved, it is presented in a separate section near the end of this application.

When relay CH is released and relay DSCH is operated, a discharge path in the form of a resistor 45 is connected across capacitor 44. At the same time the lower end of the resistor-capacitor combination is biased by a voltage source 46 and a flip-flop 47 is set. When the voltage level at the upper terminal of capacitor 44 decreases to a predetermined level, a voltage comparator 48 is triggered and the comparator produces an output that resets flip-flop 47. The duration of the output of flip-flop 47 is therefore logarithmically related to the amplitude of the input to amplifier-rectifier 43; that is, the durations of the pulses represent in decibels the amplitudes of the amplifier-rectifier input.

For noise measurements, relay NT is operated. The output of amplifier 40 now passes through a noise filter 49 and an amplifier 50 to converter 42. Amplifier 50 increases the sensitivity of the equipment. At the same time a resistor 51 is connected in parallel with capacitor 44 to decrease the time constant. This decrease in time constant causes the decibel scale factor of the amplifier-rectifier circuit output to be compressed by a factor of ten. This is considered desirable because noise measurements generally need not be made with the same degree of accuracy as loss measurements. A bias source 52 is connected at this time to the lower extremity of the parallel combination. This increases the decibel range over which the noise can be measured.

The output of converter 42 is applied to computer circuits 53 where its duration and deviation from a predetermined duration are determined. This may be accomplished in a number of different ways. A preferred way uses an oscillator that produces an output for the duration of the output of converter 52. A counter then counts the oscillations as a measurement of duration while a preset counter counts down from a preset value to measure the deviation from a predetermined duration. The output of computer circuits 53 is applied by a lead 54 to control and record equipment 21 of FIG. 1.

FIG. 2 also includes a milliwatt supply 55. The output of this supply is sent out over lead 39 when relay MWT is operated.

A loss measurement self-check of the near-end equipment is performed when relays MWT and SC are operated. Under these conditions, the output of supply 55 passes through amplifier 40 and high-pass filter 41 to converter 42. Computational circuits 53 measure the output of converter 42 as previously described and send the measurements back to control and record circuit 21 of FIG. 1.

A noise self-check measurement is preformed when relays NT and SC are operated. The output of supply 55 now passes through a 70 db attenuation pad 56, noise filter 49 and amplifier 50 to converter 42. Computational circuits 53 again measure the output of converter 42 as previously described and send the measurements back to control and record circuit 21 of FIG. 1.

The near-end equipment also includes a conventional frequency shift data receiver 57. When relay RCV is operated, frequency shift data on lead 39 is applied to the receiver. The output of the receiver, which is in a pulse-width form, is applied to computational circuits 53 where it is handled in the same manner as the output of converter 42.

Figure 3:
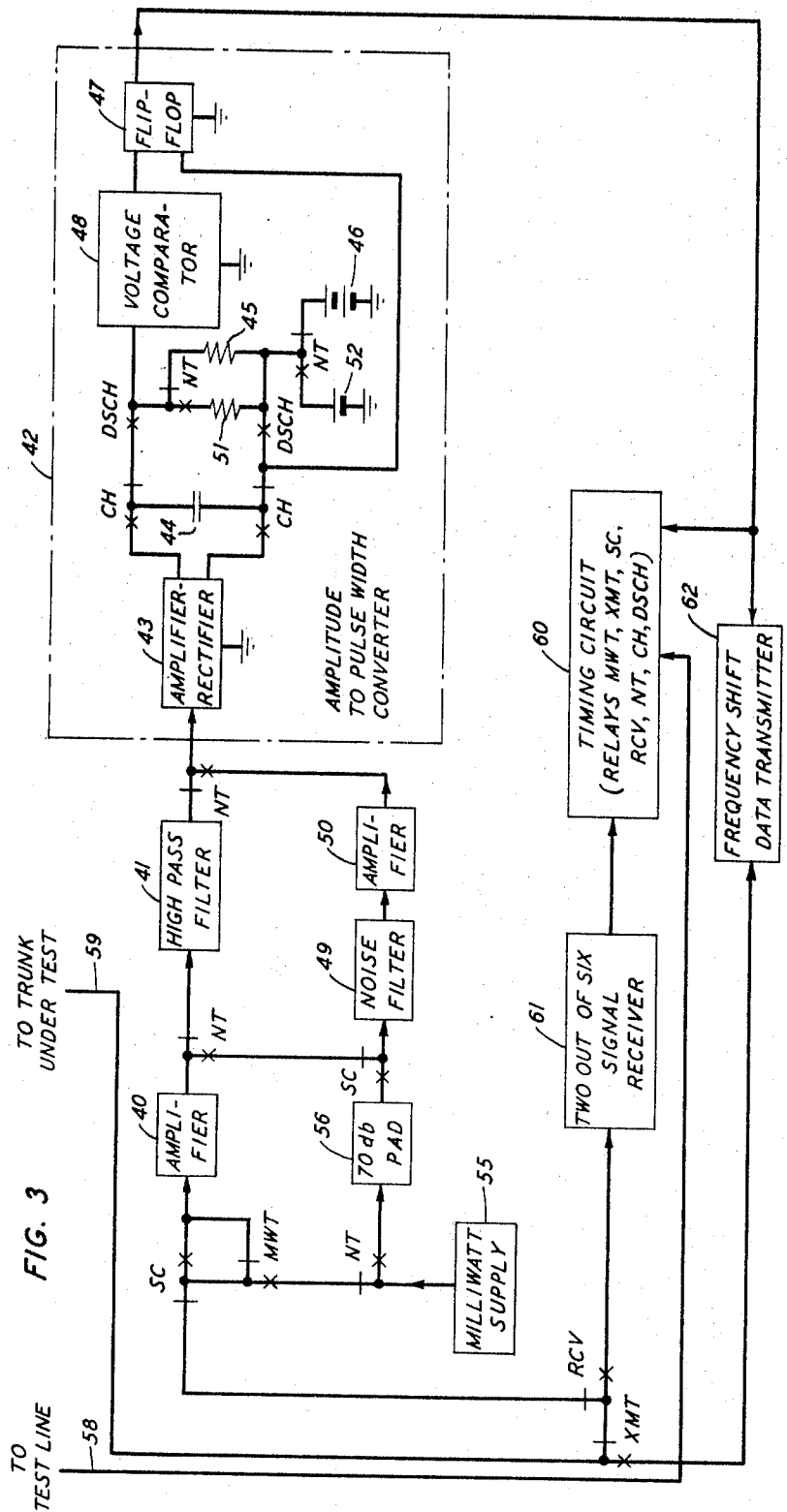
FIG. 3 is a block diagram of a single-ended far-end test equipment for use in FIG. 1.

Description of FIG. 3

FIG. 3 discloses a single-ended far-end test equipment that may be used for test equipments 32, 33 and 35 of FIG. 1. This equipment includes an amplifier 40, a filter 41, a converter 42, a pad 56, a filter 49, an amplifier 50, a supply 55 and various interconnections identical in structure and operation to those in the near-end equipment of FIG. 2. The same symbols have been used to identify these elements.

FIG. 3 has a pair of leads 58 and 59 that are connected to its test line and the trunk under test, respectively. Lead 58 is connected to a timing circuit 60 which includes relays MWT, XMT, SC, RCV, NT, CH and DSCH. The test line places a signal on lead 58 when the equipment has been connected to the trunk under test. This signal operates the RCV relay which, in turn, connects a two-out-of-six frequency signal receiver 61 to lead 59. A two-out-of-six frequency signal received over the trunk under test causes receiver 61 to trigger timing circuit 60. The timing circuit then sequentially operates its relays in a manner which is discussed later in detail.

The output of converter 42 is applied to a conventional frequency shift data transmitter 62 whose output, in turn, is transmitted over lead 59 when relay XMT is operated. Loss, noise and self-check measurements are thus transmitted back over the trunk under test in frequency shift data form.

Figure 4:
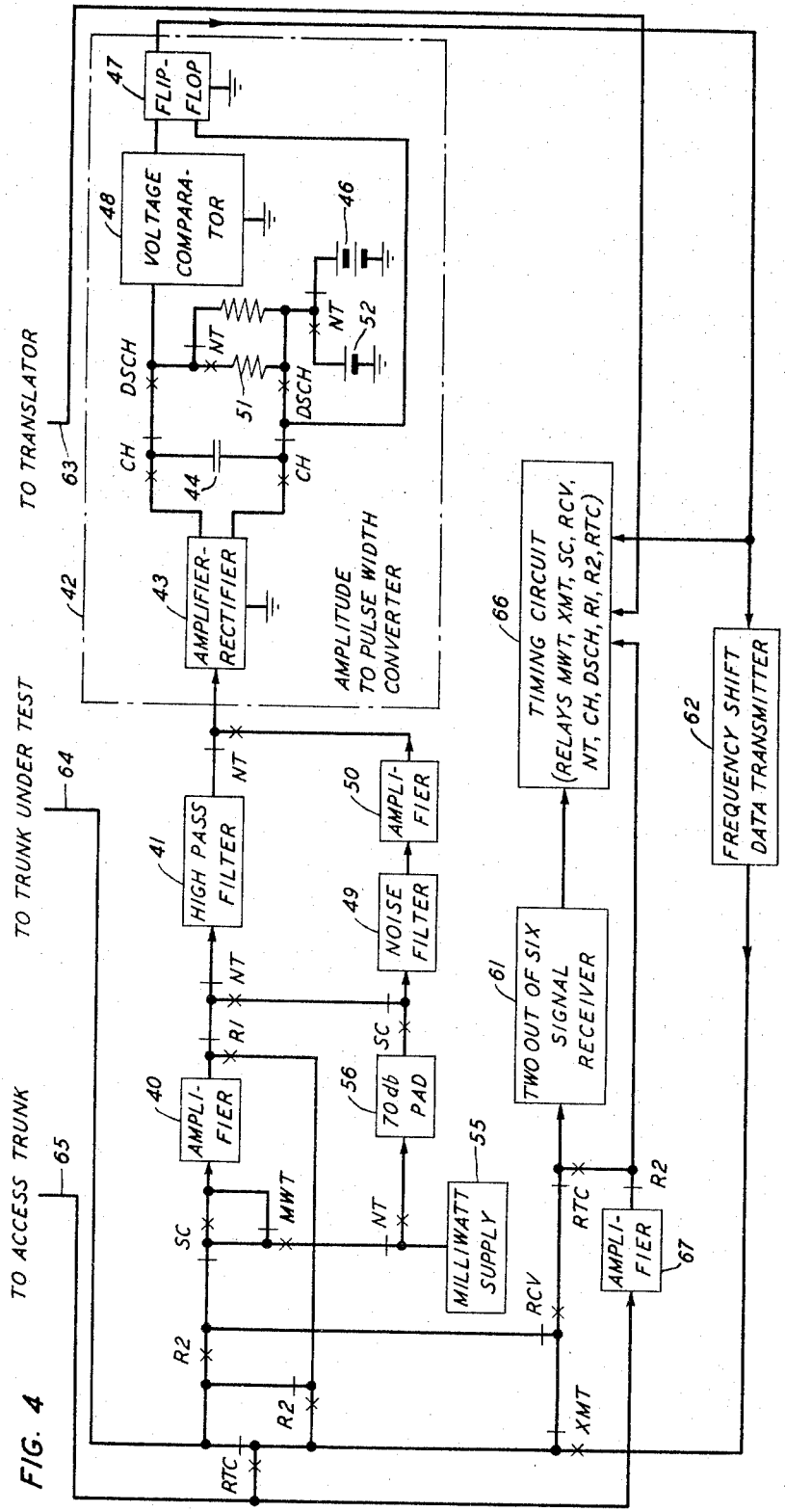
FIG. 4 is a block diagram of a double-ended far-end test equipment for use in FIG. 1.

Description of FIG. 4

FIG. 4 discloses a double-ended far-end test equipment that may be used for test equipments 34 and 36 of FIG. 1. This equipment includes an amplifier 40, a filter 41, a converter 42, a pad 56, a filter 49, an amplifier 50, a supply 55 and various interconnections identical in structure and operation to those in the equipments of FIGS. 2 and 3. It also includes a two-out-of-six frequency signal receiver 61 and a frequency shift data transmitter 62 identical in structure and operation to those in FIG. 3. The previously used symbols have been used to identify these elements in FIG. 4.

FIG. 4 has three leads 63, 64 and 65 that are connected to its translator, the trunk under test and its access trunk, respectively. Lead 63 is connected to a timing circuit 66 which includes relays MWT, XMT, SC, RCV, NT, CH, DSCH, R1, R2 and RTC. The translator places a signal on lead 63 when the trunk under test and the test equipment at the other end of that trunk have been seized. This signal causes the RTC and R1 relays to be operated. Relay RTC connects two-out-of-six frequency signal receiver 61 to lead 65 by way of an amplifier 67. At the same time relays RTC and R1 connect the trunk under test to the access trunk by way of amplifier 40. A two-out-of-six frequency signal received over the access trunk causes receiver 61 to trigger timing circuit 66. The two-out-of-six signal is also sent to the far-end equipment over the trunk under test.

The output of converter 42 is applied to frequency shift data transmitter 62 whose output, in turn, is transmitted over lead 65 when relays XMT and RTC are operated. Frequency shift data signals, representing measurements made at the other end of the trunk under test, are sent out over the access trunk by way of amplifier 40 when relays RTC, R1, R2 and RCV are operated.

Operation between near-end equipment and single-ended far-end equipment

Figure 5:
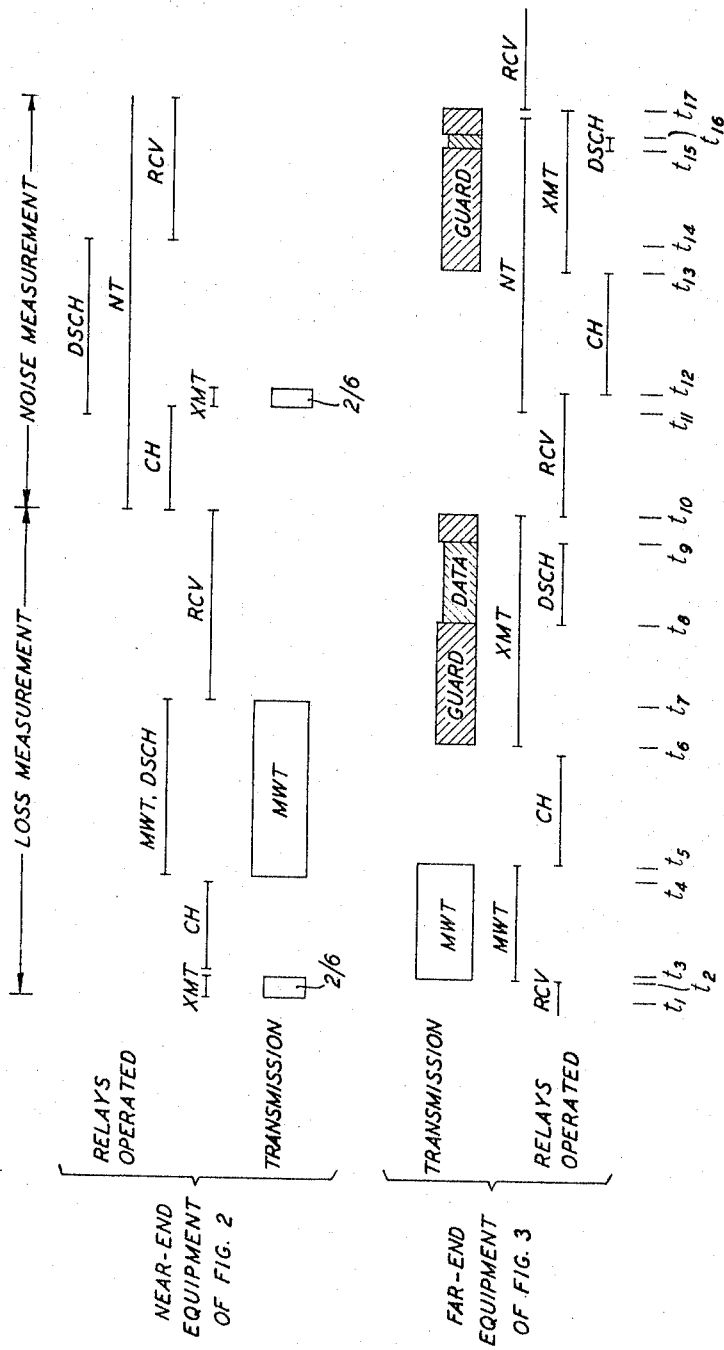

FIG. 5 shows a typical timing sequence for loss and noise measurements between offices 11 and 12 of FIG. 1 when using the equipments of FIGS. 2 and 3.

Prior to time t1, equipments 31 and 33 were connected to the trunk under test and relay RCV in FIG. 3 was operated by test line 23. The steps involved in connecting these equipments to the trunk were discussed previously.

At time t1 control and record equipment 21 triggers timing circuit 36 to begin a loss measurement cycle. Relay XMT then operates for the interval t1–t2 so that a two-out-of-six frequency signal is transmitted by the near-end equipment. Reception of this signal at the far-end equipment is recognized by receiver 61 and timing circuit 60 is triggered into action. Both timing circuits are now operating.

When timing circuit 60 begins operating, relay RCV in FIG 3 releases. Relay MWT in FIG. 3 then operates for the interval t2–t5 and a milliwatt test tone is transmitted. The amplitude of the received tone is obtained between times t3 and t4 by the operation of relay CH in FIG. 2. (Note that relay MWT in FIG. 3 is released after relay CH in FIG. 2.) A width modulated pulse is produced by the near-end equipment during the interval t4–t7 by the operation of relay DSCH in FIG. 2. This pulse is applied to computer circuits 53 whose output is, in turn, applied to control and record equipment 21.

Relay MWT in FIG. 2 then operates for the interval t4–t7 and a milliwatt test tone is transmitted. The amplitude of the received tone is obtained between times t5 and t6 by the operation of relay CH in FIG. 3. At time t6 relay XMT in FIG. 3 operates and a guard tone is transmitted by frequency shift data transmitter 62. This tone preconditions any echo suppressors in the trunk under test for subsequently produced data tones. At time t8 relay DSCH in FIG. 3 operates and a frequency shift data pulse is transmitted between times t8 and t9. Another guard tone is produced following the data pulse to prevent echoes from distorting the data pulse. Relay DSCH releases shortly after time t9 as a result of the termination of the output of flip-flop circuit 47. Relay XMT releases at time t10. At the near-end equipment, relay RCV is held operated between times t7 and t10, thereby permitting the received data pulse to be processed by its receiver 57. The output of receiver 57 is applied to computer circuits 53 whose output, in turn, is applied to control and record equipment 21. At this point the measurement of the two-way loss of the trunk under test is completed.

Noise measurements begin at time t10. Relay RCV in FIG.3 operates for the interval t10–t12 thus connecting receiver 61 to the trunk under test. This accomplishes two things: First, the amplifier provides an approximate 600 ohm termination to the trunk and, second, the far-end equipment is placed in condition to respond to two-out-of-six frequency signals. In the near-end equipment, relay NT operates at time t10 and remains operated until the end of the noise test. Relay CH in FIG. 2 operates for the interval t10–t11, thus sampling the amplitude of the noise received at the near-end equipment. Relay DSCH in FIG. 2 then operates for the interval t10–t14 to produce an output pulse having a duration logarithmicallly related to the integrated noise. This pulse is applied to computational circuits 53 whose output, in turn, is applied to control and record equipment 21.

Relay XMT in FIG. 2 operates for the interval t11–t12, so that a two-out-of-six frequency signal is sent to the far-end equipment of FIG. 3 to instruct the far-end equipment to make a noise measurement. The far-end equipment immediately operates its relay NT and holds it operated until the end of the test. With the release of relay XMT in FIG. 2, amplifier 40 is connected to the trunk to provide an approximate 600 ohm termination and relay CH in FIG. 3 operates. The amplitude of the noise received at the far-end equipment is thus sampled until time t13 when relay CH releases and relay XMT operates to transmit a conditioning guard tone. At time t14, relay RCV in FIG. 2 operates to connect frequency shift data receiver 57 to the trunk. Relay DSCH in FIG.

3 operates for the interval t15–t16 and a frequency shift data pulse representative of the measured noise is transmitted to the near-end equipment. Receiver 57 processes the received data pulse and applies its output to computer circuits 53 whose outputs, in turn, are applied to control and record equipment 21. A second guard tone is transmitted by the far-end equipment between times t16 and t17. At time t17, relays NT and RCV in FIG. 2 and relay XMT in FIG. 3 release while relay RCV in FIG. 3 operates. The noise tests are now completed and the equipments are back in the states in which they were preceding time t1.

*Operation between near-end equipment, double-ended far-end equipment and single-ended far-end equipment*

Figure 6:
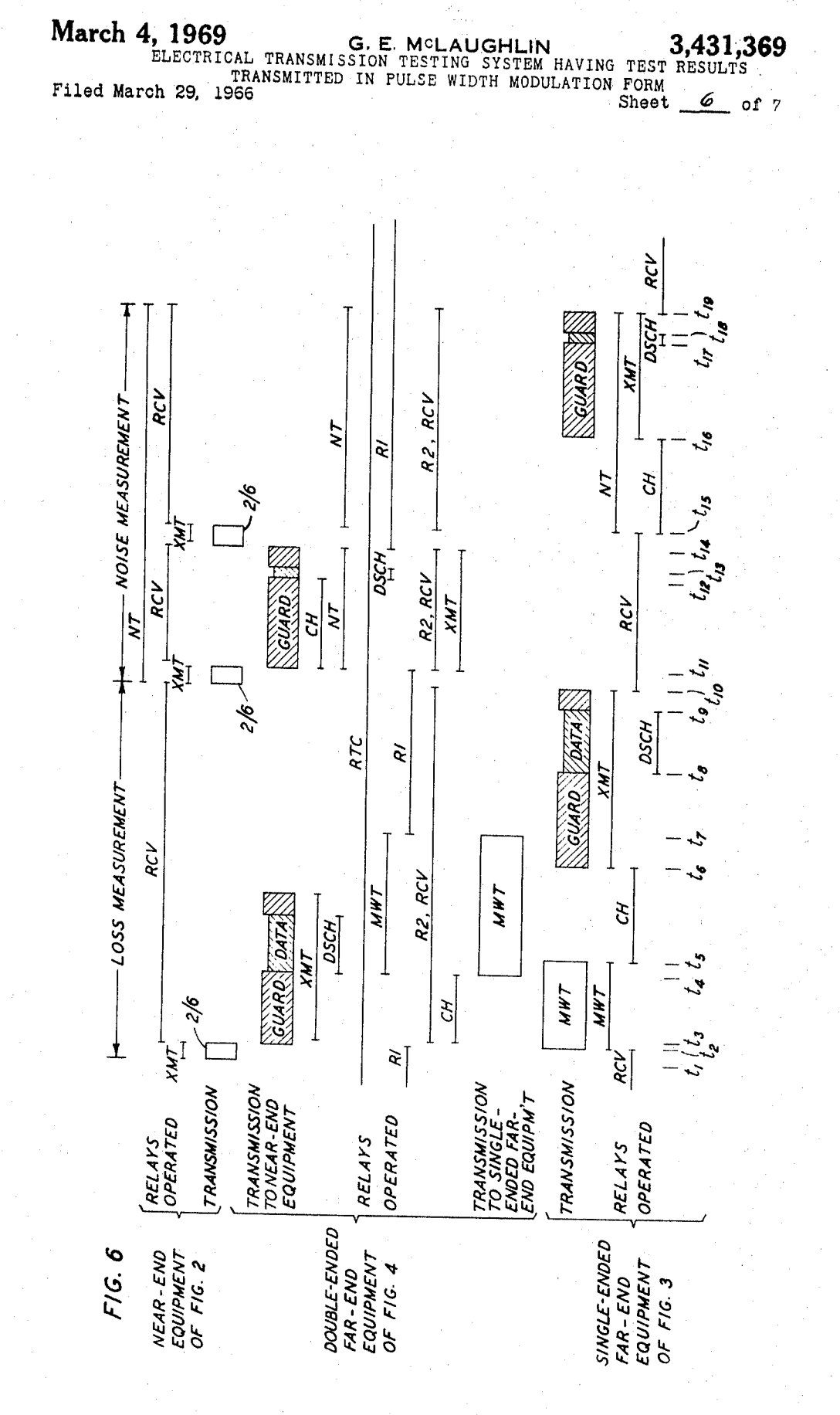

FIG. 6 shows a typical timing sequence for loss and noise measurements between offices 13 and 14 of FIG. 1 when using the equipment of FIGS. 2, 3 and 4.

Referring to FIG. 6, it will be seen that relays RTC and R1 in the double-ended far-end equipment of FIG. 4 were operated prior to time t1. These relays were operated when the equipment was connected to access trunk 17. Relay RTC remains operated until the tests are completed while relay R1 releases and operates several times during the tests.

Relay RCV in the single-ended far-end test equipment of FIG. 3 was operated when this equipment was connected to trunk 18. It remains operated until time t2.

Relay XMT in FIG. 2 operates for the interval t1–t2. During this interval, a two-out-of-six frequency signal is transmitted by FIG. 2 to FIG. 4. This signal is applied by way of amplifier 67 to the two-out-of-six signal receiver 61 in FIG. 4. The output of the receiver starts timing circuit 66 in FIG. 4. The two-out-of-six signal is also applied to the trunk under test by way of amplifier 40 in FIG. 4. When this signal arrives at the other end of the trunk under test, it is applied to two-out-of-six signal receiver 61 in FIG. 3. The output of this receiver is applied to timing circuit 60 to start the operation of this circuit. The timing circuits in FIGS. 2, 3 and 4 are now all operating. Relay R1 releases at time t2.

Relay MWT in FIG. 3 operates for the interval t2–t5 and a milliwatt test tone is transmitted from this equipment to FIG. 4 equipment. At time t3 relays XMT, R2, RCV and CH in FIG. 4 are operated. At this time FIG. 4 begins the transmission of a guard tone toward FIG. 2. This guard tone preconditions any echo suppressors in trunk 17 so that subsequently transmitted data tones will be satisfactorily transmitted over the trunk. Between time t3 and time t4 the amplitude of the test tone received from FIG. 3 is sampled in FIG. 4. At time t4 relay CH in FIG. 4 releases while relays DSCH and MWT in FIG. 4 operate. The operation of relay DSCH causes a data pulse to be transmitted from FIG. 4 to FIG. 2. This data pulse is applied to receiver 57 in FIG. 2 which translates the received pulse and applies its output to computational circuits 53. The output of computational circuit 53, which represents the loss from central office 14 to central office 13, is applied to control and record equipment 21.

The operation of relay MWT in FIG. 4 in the interval t4–t7 causes a milliwatt of test tone to be transmitted toward FIG. 3. In FIG. 3 the operation of relay CH for the interval t5–t6 causes the amplitude of the received test tone to be sampled. At time t6 relay XMT in FIG. 3 operates and a guard tone is transmitted to FIG. 4. At time t7 relay R1 in FIG. 4 operates. The operation of relay R1 causes the signals received from FIG. 3 to be passed through amplifier 40 in FIG. 4 and transmitted over the access trunk back to FIG. 2. Relay DSCH in FIG. 3 operates for the interval t8–t9 and a data pulse representative of the measured loss is transmitted back through amplifier 40 in FIG. 4 to data receiver 57 in FIG. 2. The output of receiver 57, which represents the loss from central office 13 to central office 14, is applied to computational circuits 53 whose output, in turn, is applied to control and record equipment 21. Following the transmission of the data pulse another guard tone is transmitted by FIG. 3. At time t10 relay XMT in FIG. 3, relays R2 and RCV in FIG. 4 and relay RCV in FIG. 2 release. Relay RCV in FIG. 3 then operates and the equipments of FIG. 3 and FIG. 4 are now in the conditions in which they were prior to time t1. The two-way loss measurement over trunk 18 is completed.

The sequence for noise measurements of trunk 18 is now discussed.

At time t10 relay NT in FIG. 2 operates and remains operated until the end of the noise measurement. Relay XMT in FIG. 2 then operates for the interval t10–t11 to transmit a two-out-of-six frequency signal to FIG. 4. This signal is applied by way of amplifier 67 to receiver 61 in FIG. 4. The output of receiver 61 triggers timing circuit 66 to start the timing cycle of FIG. 4. Relay NT operates at time t11 and remains operated until time t14. The two-out-of-six signal from FIG. 2 also passes on to FIG. 3 by way of amplifier 40 in FIG. 4. This particular two-out-of-six signal is ignored by receiver 61 of FIG. 3.

At time t11 relay R1 in FIG. 4 releases and relay RCV in FIG. 2 and relay RCV, R2 and XMT in FIG. 4 operate. Relay CH in FIG. 4 operates for the interval t11–t12 and samples the amplitude of the noise received at FIG. 4 from trunk 18. In the interval t12–t13 relay DSCH in FIG. 4 operates and a data signal representative of the measured noise from office 14 to office 13 is transmitted by FIG. 4 to FIG. 2. At time t14 relays RCV, R2 and XMT in FIG. 4 release and relay R1 operates so that the equipment of FIG. 4 is now in the condition in which it was prior to time t1. At FIG. 2 the data information is converted by received 57 and applied to computational circuits 53. The output of circuits 53 is applied to control and record equipment 21.

A second two-out-of-six signal is transmitted by FIG. 2 through the operation of relay XMT in the interval t14–t15. This second signal is applied to receiver 61 in FIG. 4 by way of amplifier 67. The output of receiver 61 triggers timing circuit 66. This second signal is also passed by way of amplifier 40 of FIG. 4 to the trunk under test. Upon arriving at FIG. 3 this signal is applied to receiver 61 which triggers timing circuit 60. At time t15 relay RCV in FIG. 2, relays NT, R2 and RCV in FIG. 4 and relays CH and NT in FIG. 3 operate. FIG. 3 is now sampling the amplitude of the noise received from trunk 18. At time t16 relay CH in FIG. 3 releases while relay XMT operates. A guard tone is then transmitted by FIG. 3 through amplifier 40 in FIG. 4 to receiver 57 in FIG. 2. At time t17 relay DSCH in FIG. 3 operates and a data signal representative of the noise measured at office 14 is transmitted. A second guard tone is transmitted between times t18 and t19. At time t18 relay DSCH of FIG. 3 is released. At time t19 relays XMT and NT in FIG. 3, relays NT, R2 and RCV in FIG. 4 and relays NT and RCV in FIG. 2 are released. At time t19 relay RCV in FIG. 3 operates. Relay RTC, which was operated prior to time t1, has remained operated throughout the entire test and is still operated following time t19. The noise tests are now completed and the equipments of FIG. 3 and FIG. 4 are back in the states in which they were preceding time t1. Any or all of the preceding test sequences can now be repeated.

In a typical application the complete sequence of FIG. 6 takes place in approximately three and one-half seconds which is approximately one-half of a second greater than the time required to perform the sequence shown in FIG. 5. The time required for the sequence of FIG. 6 may be reduced by modifying the timing circuit of FIG. 3 so that relay CH in that circuit operates automatically within a certain time period after the occurrence of the two-out-of-six frequency signal occurring between times t10 and t11. In other words, the noise measurement from FIG. 4 to FIG. 3 would be moved over in time in the sequence chart so that it partially overlaps the noise measurement cycle in the FIG. 3–FIG. 4 direction. It should be noted, however, that such a modification applied to FIG. 3 would increase the time required for the sequence of FIG. 5. This latter condition would come about because the operation of relay CH in FIG. 3 as shown in the sequence of FIG. 5 would occur at some time following the occurrence of the two-out-of-six frequency signal between the times $t11$ and $t12$ of that sequence chart.

*Description and operation of FIG. 7*

The amplifier-rectifier shown in FIG. 7 includes a relatively high gain amplifier 68 having a feedback path comprising a capacitor 69, a passive parallel network and a pair of resistors 70 and 71. Input voltages are applied to amplifier 68 by way of a resistor 72.

One branch of the passive parallel network connected in the feedback path includes a pair of diodes 73 and 74 and a resistor 75 connected in series with the diodes poled for easy current flow away from the output of amplifier 68. A resistor 76 is connected in parallel with diode 74. The second branch of the parallel network includes a pair of diodes 77 and 78 and a resistor 79 connected in series with the diodes poled for easy current flow toward the output of amplifier 68. A resistor 80 is connected in parallel with diode 78. First and second normally closed sets of contacts of relay NT are connected across diodes 74 and 78, respectively.

A diode 81 and an inductor 82 are selectively connectable between the junction of diodes 73 and 74 and an output terminal 83 by way of contacts on relay NT. The junction between diodes 77 and 78 is connected to an output terminal 84 while a resistor 85 is selectively connectable between the output terminals by way of contacts on relay NT. In each of FIGS. 2, 3 and 4, terminals 83 and 84 are connected to a capacitor 44 when a relay CH is operated. To facilitate the following discussion, a capacitor 44 and contacts of a relay CH are shown in phantom in FIG. 7.

With relay NI in a released state and relay CH operated (the conditions for a loss measurement; see FIGS. 5 and 6), inductor 82 and capacitor 44 are connected in series between the cathode of diode 73 and the anode of diode 77. Diodes 74, 78 and 81 and resistors 76 and 78 are effectively out of the circuit. When an input signal is applied via resistor 72, the amplifier output voltage rapidly increases until either diode 73 or 77 conducts; the amplifier output voltage is then the inverse of the contour of the signal applied via resistor 72. When diode 73 conducts, current flows through resistor 75 to resistors 70 and 71. At the same time, current flows through inductor 82 to capacitor 44 while current also flows from capacitor 44 through resistor 79 to resistors 70 and 71. When, on the other hand, diode 77 conducts, current flows through resistor 79 to diode 77. At the same time, current flows from resistors 70 and 71, through resistor 75 and inductor 82 to capacitor 44 while current also flows from capacitor 44 to diode 77. Conduction of either diode therefore places a charge on capacitor 44 so that terminal 83 is positive with respect to terminal 84. The charge placed on capacitor 44 produces a voltage which is the average value of the signal applied via resistor 72 after it is amplified and full-wave rectified.

Before discussing the other mode of operation of FIG. 7, a brief comment as to the function of inductor 82 may be helpful. Capacitor 44 presents a varying impedance as it charges. In order to prevent this varying impedance from affecting the feedback path, the path is constructed so that the capacitor is always connected in series with inductor 82 and, furthermore, so that this series combination always forms part of a leg of a parallel combination. The other leg of the parallel combination comprises either resistor 75 or resistor 79 which have values much less than the AC impedance presented by inductor 82. The varying impedance of capacitor 44 is thereby substantially eliminated because this portion of the feedback path has a substantially constant imepdance value equal to the value of either one of the resistors 75 and 79.

For noise measurements relays NT and CH are operated (see FIGS. 5 and 6). Under these conditions diodes 74, 78 and 81 and resistors 76, 77 and 85 are effective in the circuit while inductor 82 is ineffective. For positive inputs through resistor 72, a negative replica offset by a negative voltage equal to the drop across diode 78 appears between the junction of diodes 77 and 78 and ground. This causes current to flow from resistors 70 and 71, through resistor 79 and diode 78 (resistor 80 is now effectively out of the circuit as a result of conducting diode 78) to diode 77. At the same time, current flows from resistors 70 and 71 through resistors 75 and 76, diode 81 to resistor 85 and capacitor 44; it also flows from resistor 85 and capacitor 44 to diode 77. Diode 73 is now reverse biased. This places a charge on capacitor 44 so that terminal 83 is positive with respect to terminal 84. Furthermore, diodes 78 and 81 are selected so that the aforementioned voltage offset produced by diode 78 approximates the voltage drop across diode 81. By this means the voltage applied across capacitor 44 is directly related to the input signal applied to resistor 72.

Similarly, for negative inputs through resistor 72, a positive replica offset by a positive voltage equal to the drop across diode 74 appears between the junction of diodes 73 and 74 and ground. This voltage produces a current flow through diode 74 (resistor 76 is effectively out of the circuit when diode 74 is conducting) and resistor 75 to resistors 70 and 71. At the same time, current flows through diode 81 to resistor 85 and capacitor 44; it also flows from resistor 85 and capacitor 44 through resistors 80 and 79 to resistors 70 and 71. This also places a charge on capacitor 44 so that terminal 83 is positive with respect to terminal 84. Furthermore, the offset voltage again compensates for the drop across diode 81.

The values of components in this circuit may be selected so that the voltage across capacitor 44, when relay NT is in an operated state, can be made the same for any two input signals of equal R.M.S. value applied to resistor 72. For example, the voltage on capacitor 44 can be made the same for both sine waves and white noise of equal R.M.S. value when the ratio of the value of resistor 85 to the sum of the values of resistor 85 and the circuit connected to resistor 85 is approximately eight-tenths. In an actual circuit, this quasi-R.M.S. relationship was produced by using the following values of resistances to produce an eight-tenths ratio:

|  | Ohms |
| --- | --- |
| Resistor 85 | 42,000 |
| Resistors 75, 79 | 1,700 |
| Resistors 76, 80 | 7,500 |
| Resistor 71 | 100 |
| Output impedance of amplifier 68 | 26,000 |

*Concluding comments*

The sequence diagrams of FIGS. 5 and 6 are not drawn to scale. Furthermore, some of the operating and release times of the relays do not necessarily have to occur simultaneously as shown in the diagrams. For example, some of the operations of the DSCH relays can be shortened without adversely affecting the operation of the circuits. Furthermore, some of the relays may be of the slow release type to insure the operation of other relays before their release. These technicalities are well within the scope of those skilled in the art.

Although the invention has been disclosed with respect to a particular embodiment, various other embodiments may be devised by those skilled in the art without departing from the spirit and scope of the invention.

What is claimed is:

1. A measuring system for a two-way electrical communication path interconnecting a pair of terminals wherein said system comprises means at each of said terminals for applying a standard amplitude test tone to said path, means at each of said terminals for producing pulses having durations related to the amplitudes of waves received at said terminals, means for transmitting said pulses produced at a first of said terminals to the second terminal, and means responsive to said first and second terminal pulses to produce outputs related to the durations of these pulses.

2. A system in accordance with claim 1 wherein said pulse durations are logarithmically related to said amplitudes.

3. A measuring system for a two-way electrical path connected between two central offices where data is obtained at each office and collected at a common point which may be located in one of said offices, said system comprising at each of said offices a converter to produce output pulses having durations related to inputs to said converter, a source of test signals of predetermined strength, timing means, switching means responsive to said timing means to selectively apply said test signals to said transmission channel and, furthermore, received waves to said converter, means responsive to control signals from said common point to trigger said timing means, and transmitting means connected to said switching means to transmit said converter output to said common point.

4. A system in accordance with claim 3 in which each of said converters comprises an amplifier-rectifier circuit, a capacitor, means to selectively connect said capacitor to the output of said amplifier-rectifier circuit, a discharge path, a voltage comparator connected to said discharge path, a bistable circuit having a pair of inputs where one of said inputs is connected to the output of said comparator, and means to selectively connect said discharge path across said capacitor while simultaneously applying an input signal to the other of said bistable inputs.

5. A measuring system for a two-way electrical communication path interconnecting two central offices wherein:

said system comprises at each of said central offices, a converter to produce output pulses having durations related to the amplitudes of inputs to said converter, a source of test signals of predetermined amplitude, timing means, and switching means responsive to said timing means to selectively apply said test signals to said path, and furthermore, received waves to said converter;

said system further comprises at a first of said offices, a receiver responsive to control signals received over said path to control said first office timing means, and transmitting means connected to its office switching means to transmit its converter output over said path; and said system further comprises at said second office, transmitter means connected to said second office swiching means to transmit control signals to said first office, a receiver connected to said second office switching means to received signals from said first office transmitter means to produce output pulses having durations equal to the durations of said first office converter pulses, and utilization means responsive to the outputs of said second office receiver and said second office converter to produce indications related to the durations of these outputs.

6. A system in accordance with claim 5 in which each of said converters comprises an amplifier-rectifier circuit, a capacitor, means to selectively connect said capacitor to the output of said amplifier-rectifier circuit, a discharge path, a voltage comparator connected to said discharge path, a bistable circuit having a pair of inputs where one of said inputs is connected to the output of said comparator, and means to selectively connect said discharge path across said capacitor while simultaneously applying an input signal to the other of said bistable inputs.

7. A system in accordance with claim 5 in which said switching means is further responsive to said timing means to selectively apply first and second portions of said test signals to said converter as simulated received test signals and noise, respectively.

8. A system in accordance with claim 6 in which said switching means is further responsive to said timing means to selectively apply first and second portions of said test signals to said converter as simulated received test signals and noise, respectively.

9. In a system controllable from a first central office to connect test equipments at two central offices, one of which may comprise said first office, to a particular communication path interconnecting said two offices, said test equipment at each of said two offices comprising a converter to produce output pulses having durations related to the amplitudes of inputs to said converter, a source of test signals of predetermined strength, timing means, switching means responsive to said timing means to selectively apply said test signals to said transmission channel, and, furthermore, received waves to said converter, means responsive to control signals from said first office to trigger said timing means, and transmitting means connected to said switching means to transmit said converter output to said first office; and test equipment at said first office comprising means to transmit control signals to said second and third offices, receiving means to recover said converter pulses from the waves received from said transmitting means, and means responsive to the output of said receiving means to produce indications relating to their durations.

10. A system in accordance with claim 9 in which each of said converters comprises an amplifier-rectifier circuit, a capacitor, means to selectively connect said capacitor to the output of said amplifier-rectifier circuit, a discharge path, a voltage comparator connected to said discharge path, a bistable circuit having a pair of inputs where one of said inputs is connected to the output of said comparator, and means to selectively connect said discharge path across said capacitor while simultaneously applying an input signal to the other of said bistable inputs.

11. A system in accordance with claim 9 in which said switching means is further responsive to said timing means to selectively apply first and second portions of said test signals to said converter as simulated received test signals and noise, respectively.

12. A system in accordance with claim 10 in which said switching means is further responsive to said timing means to selectively apply first and second portions of said test signals to said converter as simulated received test signals and noise, respectively.

References Cited

UNITED STATES PATENTS 2,721,235  10/1955  Mckim.
2,819,354  1/1958  Shoffstall.

OTHER REFERENCES

Ericsson Review, vol. 40, No. 2 (1963), pp. 62–68, TK1E95.

WILLIAM C. COOPER, *Primary Examinery*.

A. A. McGILL, *Assistant Examiner*.